(12) United States Patent
Becker et al.

(10) Patent No.: US 7,997,648 B2
(45) Date of Patent: Aug. 16, 2011

(54) MOTOR VEHICLE SEAT WITH ADJUSTABLE SEAT DEPTH

(75) Inventors: Burckhard Becker, Solingen (DE); Wilfried Beneker, Leichlingen (DE); Frank Peters, Nettetal (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 12/016,917

(22) Filed: Jan. 18, 2008

(65) Prior Publication Data

US 2008/0174162 A1 Jul. 24, 2008

(30) Foreign Application Priority Data

Jan. 19, 2007 (DE) .......... 10 2007 003 757
Feb. 9, 2007 (DE) .......... 10 2007 007 195
Oct. 18, 2007 (DE) .......... 10 2007 049 865

(51) Int. Cl.
*B60N 2/02* (2006.01)
*B60N 2/18* (2006.01)
(52) U.S. Cl. .................. 297/284.11
(58) Field of Classification Search ......... 297/284.11, 297/344.11
See application file for complete search history.

(56) References Cited

U.S. PATENT DOCUMENTS

| | | | | |
|---|---|---|---|---|
| 2,239,732 A * | 4/1941 | Newhardt | ............ | 297/353 |
| 3,720,443 A * | 3/1973 | Mourgue | ............ | 297/383 |
| 4,401,343 A * | 8/1983 | Schmidt | ............ | 297/284.1 |
| 4,629,248 A * | 12/1986 | Mawbey | ............ | 297/284.11 |
| 4,773,703 A * | 9/1988 | Krugener et al. | ............ | 297/284.1 |
| 4,944,554 A * | 7/1990 | Gross et al. | ............ | 297/284.3 |
| 5,588,708 A * | 12/1996 | Rykken et al. | ............ | 297/423.2 |
| 5,695,250 A * | 12/1997 | Lin | ............ | 297/353 |
| 6,283,422 B1 * | 9/2001 | Stoelinga | ............ | 248/188.2 |
| 6,533,355 B2 * | 3/2003 | Broekhuis et al. | ............ | 297/353 |
| 6,601,918 B2 * | 8/2003 | Mattsson | ............ | 297/284.11 |
| 7,874,621 B2 * | 1/2011 | Gumbrich et al. | ... | 297/284.11 X |
| 2006/0061167 A1 * | 3/2006 | Adragna et al. | ............ | 297/284.1 |

FOREIGN PATENT DOCUMENTS

| | | |
|---|---|---|
| DE | 196 28 381 A1 | 1/1998 |
| DE | 199 13 503 A1 | 9/2000 |
| DE | 698 27 303 T2 | 2/2006 |

* cited by examiner

*Primary Examiner* — Rodney B White
*Assistant Examiner* — Joseph Edell
(74) *Attorney, Agent, or Firm* — McCarter & English, LLP (57) ABSTRACT

An adjustment device for a seat depth adjustment of a motor vehicle seat that has (a) a seat pan comprising a seat part and a supporting plate, the supporting plate being slidably connected to the seat part via a guide in a longitudinal direction and (b) an electric gear motor comprising a pinion. The seat part comprises a first gear plate. The supporting plate comprises a second gear plate. The guide has a left and a right profile and a left and a right counterprofile. A toothed rack extending in the same direction is associated with each counterprofile. The teeth of the two toothed racks face each other. Each toothed rack engages a gear wheel. One of the gear wheels engages an idler gear. The other gear wheel and the idler gear engage the pinion of the gear motor.

17 Claims, 7 Drawing Sheets

MOTOR VEHICLE SEAT WITH ADJUSTABLE SEAT DEPTH

CROSS-REFERENCE TO RELATED APPLICATIONS

This application claims priority to German Application Nos. DE 10 2007 003 757.2, filed Jan. 19, 2007, DE 10 2007 007 195.9, filed Feb. 9, 2007, and DE 10 2007 049 865.0, filed Oct. 18, 2007, all of which are hereby incorporated by reference in their entirety as part of the present disclosure.

BACKGROUND OF THE INVENTION

The invention relates to an adjustment device for a seat depth adjustment of a motor vehicle seat. Such a motor vehicle seat has been known from the document DE 196 28 381 A1 for example. In this prior art motor vehicle seat, the supporting plate is inserted in a U-shaped recess of the seat part that is open toward the front. The longitudinal guide is formed by a tube and a gliding bushing. Fixation between supporting plate and seat part is achieved by a volute spring.

From the document DE 698 27 303 T2 a vehicle seat is known the seat depth of which is adjustable and the front seat part of which is adjusted relative to a rear seat part by means of an electric motor. In the vehicle seat known from DE 199 13 503 A1, the seat pan also has a front portion and a rear portion that may be positioned different distances apart by means of an adjustment device for the seat depth to be adjustable.

In view of the motor vehicle seat of the type mentioned herein above, it is the object of the invention to improve the prior art motor vehicle seat in such a manner that a gear module of a motor drive to be arranged so as to save as much space as possible can be formed between the seat plate and the seat part.

SUMMARY OF THE INVENTION

This object is achieved by providing an adjustment device for a seat depth adjustment of a motor vehicle seat, which comprises a seat pan including a seat part, a supporting plate slidably connected to the seat part via a guide in a longitudinal direction, and a front region forming the front edge of the seat pan. The adjusting device further comprises an electric gear motor, which includes a pinion. In at least one embodiment, the seat part comprises a first gear plate and the supporting plate comprises a second gear plate. The guide includes a left profile and a right profile on one side, the profiles being formed on the first gear plate and, on another side, includes a left counterprofile and a right counterprofile that are formed on the second gear plate. The left and right counterprofiles contact and mate with the left and right profiles respectively. A toothed rack defining teeth is associated with each counterprofile and extends in a same direction of each counterprofile. The teeth of the toothed racks face each other and each toothed rack is drivingly connected to the pinion of the gear motor.

The adjustment device of the invention can be of a downright flat construction, it may be made from lightweight material such as plastic material. In the z direction, it needs hardly more space than the axial dimension of a gear wheel and preferably has a dimension that is smaller than twice the axial dimension of the gear wheels.

The adjustment module of the invention concurrently forms the guide. The left and right profiles as well as the left and right counterprofiles are provided for this purpose. They interengage each other. The engagement in the left region is quite distant from the engagement in the right region so that there is a large base for support and that the guide is capable of taking high forces.

Preferably, the toothed rack is built identically on either side. In the z direction, it preferably has a height that is equal to the clear distance between the two gear plates.

In the assembled condition, the respective side profile preferably forms a partial grip around the other counterprofile or vice versa. Thus, the two gear plates can only be mounted in the direction of longitudinal adjustment and cannot be separated in the z direction.

In the direction of the longitudinal adjustment, the two gear plates have a dimension that is at least 10% larger than the adjustment path in the adjustment direction, this dimension being preferably at least 30% larger than the adjustment path. In a preferred embodiment, the two gear plates are distinct. In a preferred embodiment, the two gear plates have approximately the same dimensions, more specifically the same dimensions, in the x-y plane.

BRIEF DESCRIPTION OF THE DRAWINGS

Other features and advantages of the invention will become more apparent upon reviewing the appended claims and the following non restrictive description of an embodiment of the invention, given by way of example only with reference to the drawing. In the drawing:

DETAILED DESCRIPTION OF THE INVENTION

The motor vehicle seat has a seat pan 20, a seat back 22 and an underframe 24. The seat pan 20 and also the seat back 22 are provided with a covering 26, made for example from fabric or leather. Beneath this covering 26, there is a padding 28, see FIG. 3.

Figure 1:
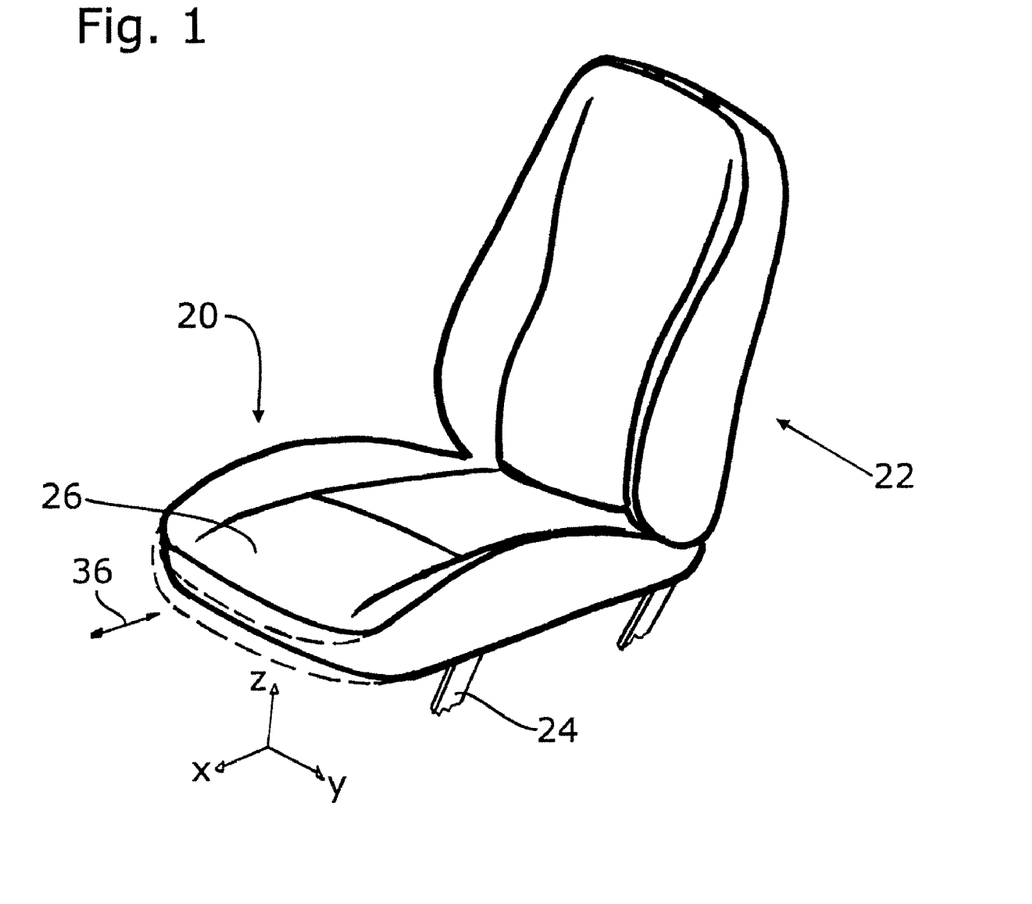
FIG. 1.: is a perspective oblique side view, from the front and above, of a motor vehicle seat of the invention.
Figure 2:
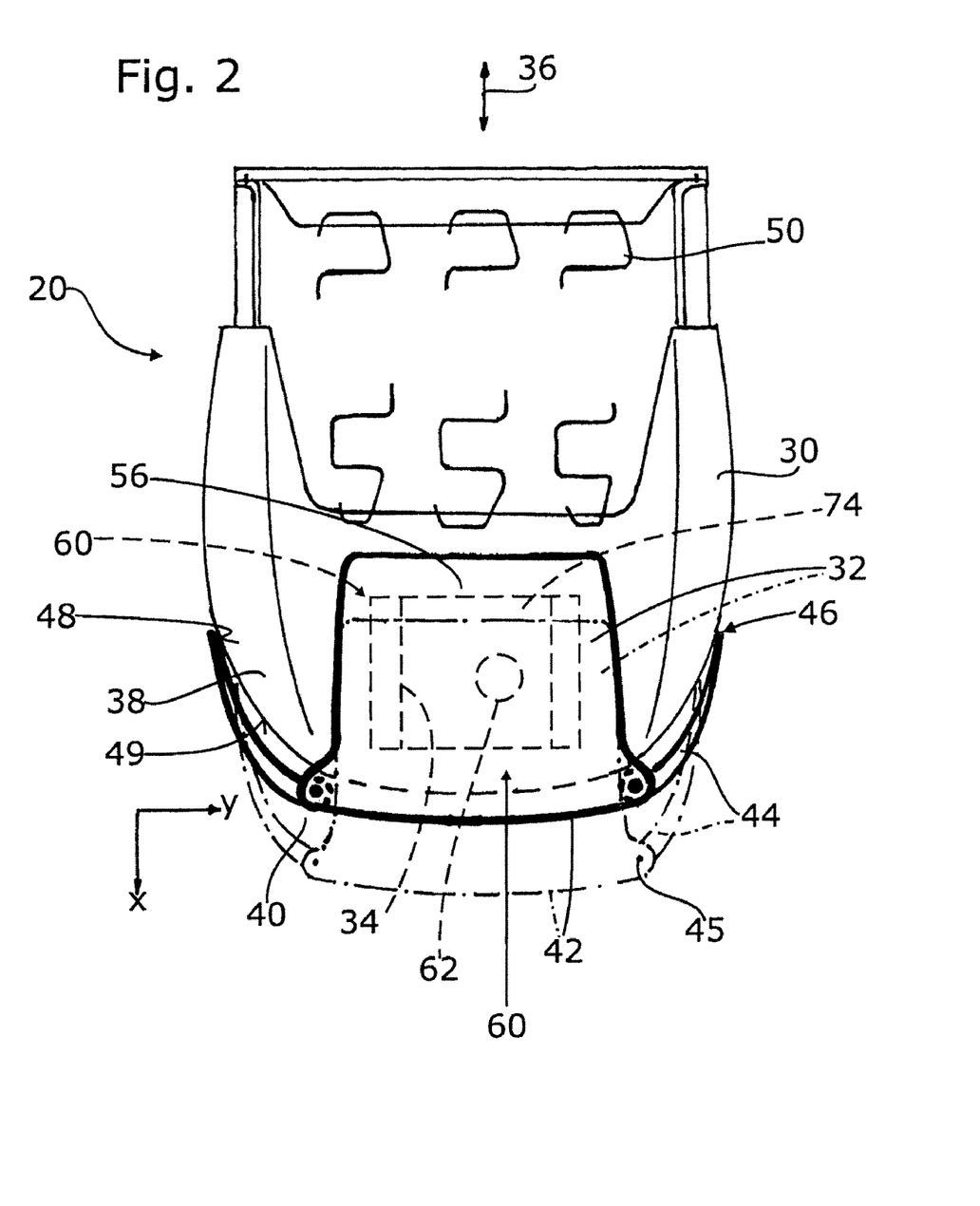
FIG. 2: is a top view of mechanical parts of the seat part of a motor vehicle seat of FIG. 1.
Figure 3:
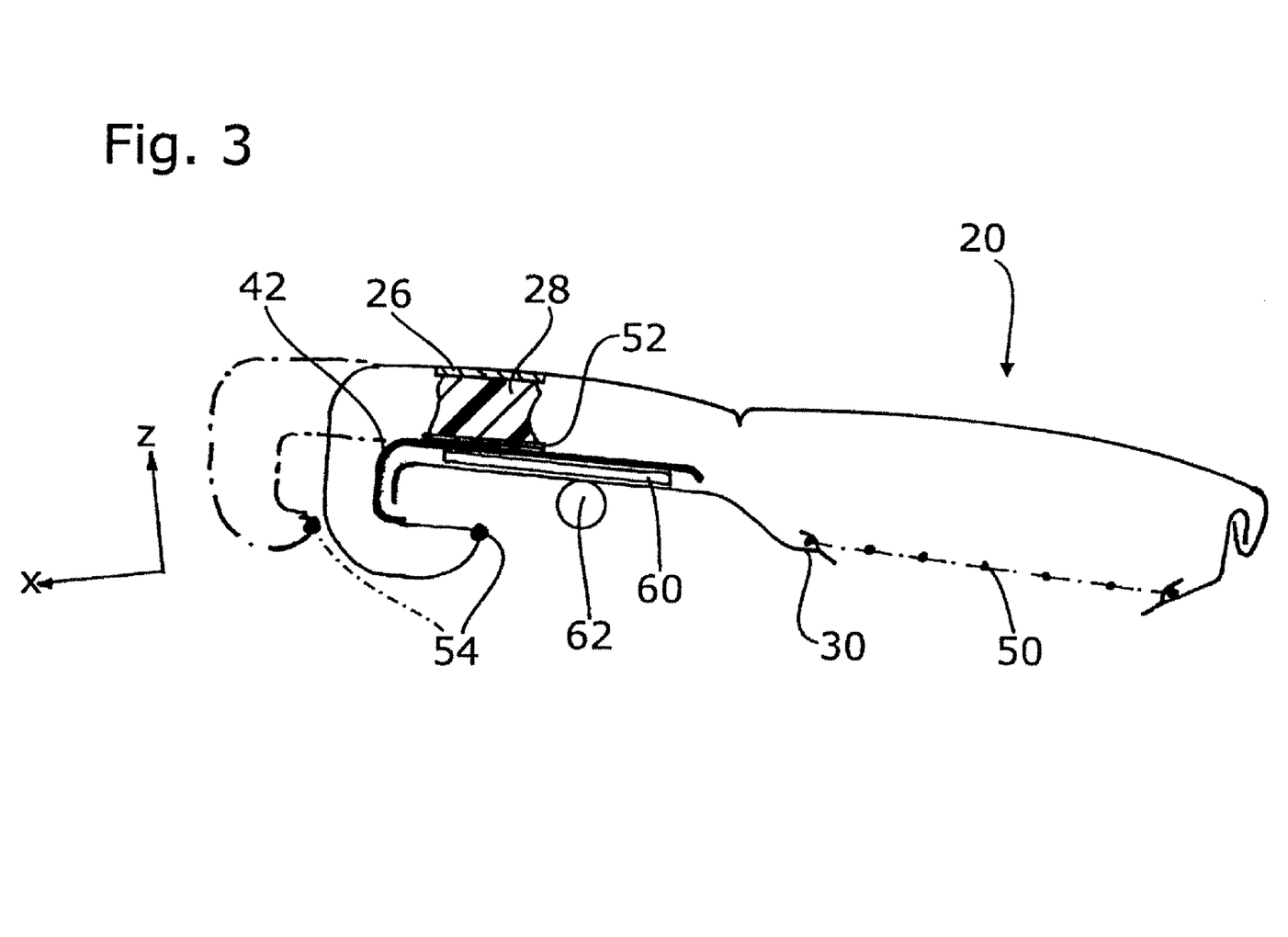
FIG. 3: is a cross-section in the x-z plane through the center of the seat pan in a retracted position (continuous line) and in an advanced position (dash-dot line) of the supporting plate.
Figure 4:
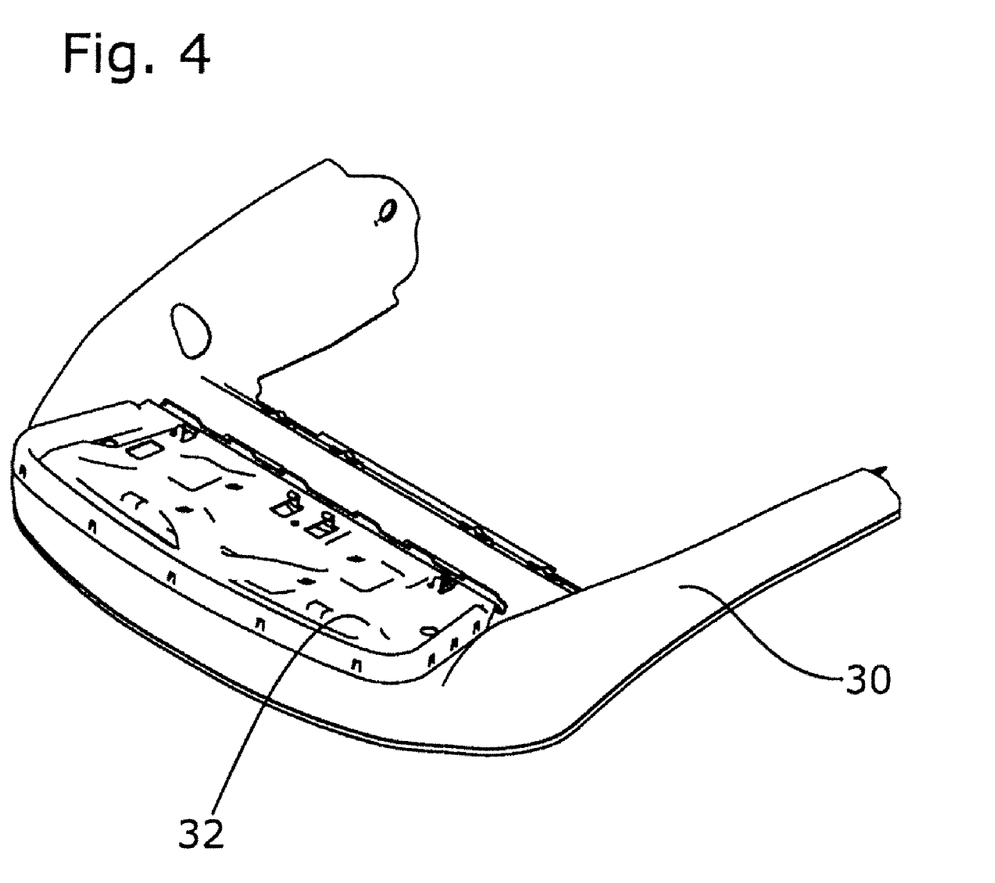
FIG. 4: is a perspective illustration of a front portion of the seat pan of FIG. 2.
Figure 5:
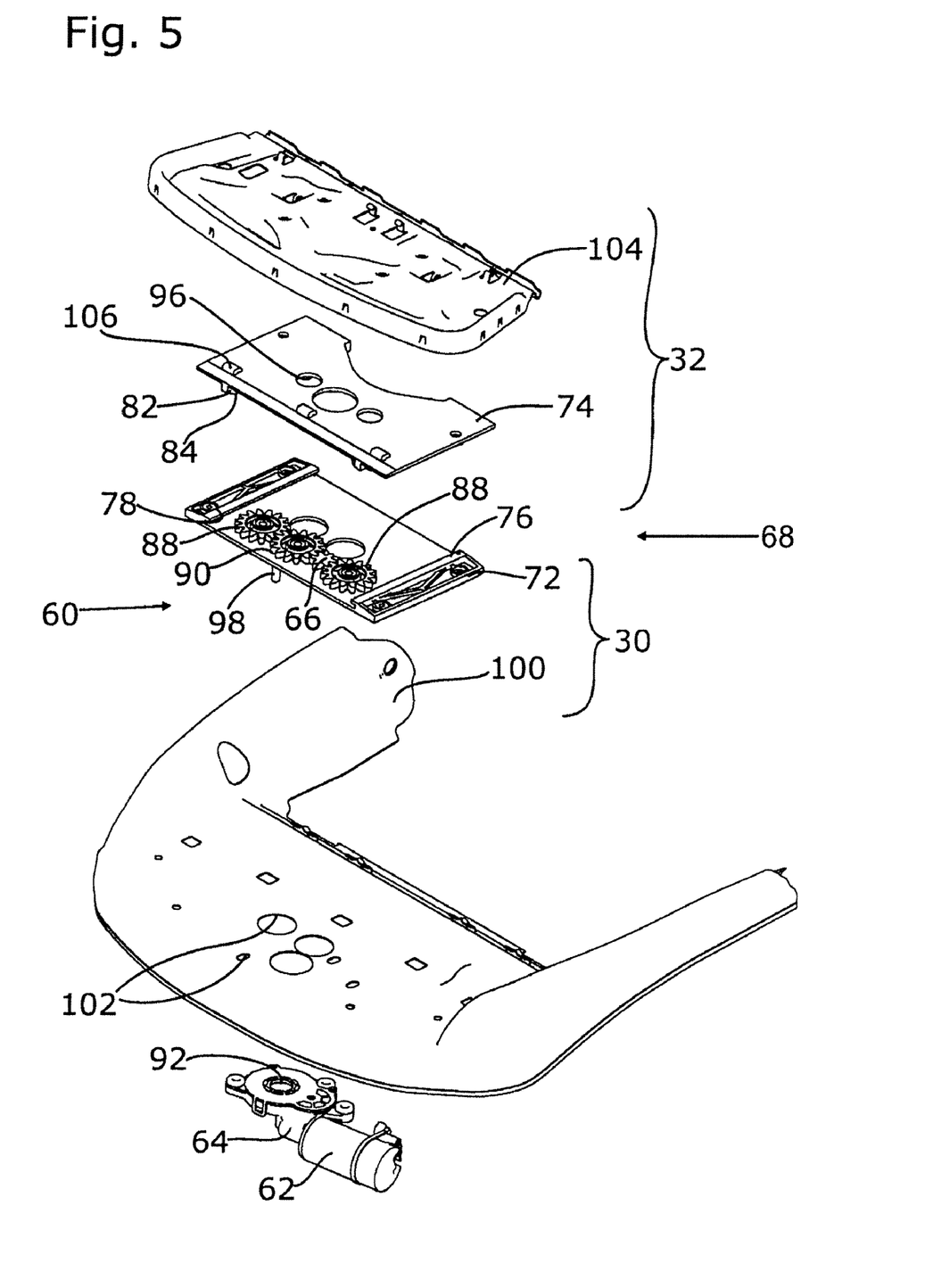
FIG. 5: is an illustration like FIG. 4, but now as an assembly drawing.

The mechanical and carrying structure of the seat pan 20 has a seat part 30 and a supporting plate 32. Both are displaceable with respect to each other in a longitudinal direction via a guide 34; the FIGS. 1 through 3 show the two extreme positions by way of example, the position with the shortest seat length being shown in a continuous line and the position with the greatest seat length in a dash-dot or dashed line. In the y direction, the supporting plate 32 has a width that only is about 60% of the width of the seat part 30, measured in the same direction. In the position with the shortest seat length, the supporting plate 32 is almost completely located in a recess 102 of the seat part 30 that is open toward the front, meaning in the x direction. On the side of this recess 102, meaning when viewed in the y direction, the seat part 30 has a left and a right seat part 38 the upper side of which is located higher than the supporting plate 32 in the z direction. These side parts 38 serve to laterally hold the thighs. The thighs of a user rest on the supporting plate 32, which is configured to be large enough for this purpose.

In the position in which the supporting plate 32 projects farthest in the x direction the supporting plate projects significantly forward with respect to the seat part 30. On the left and right side of the supporting plate 32, there are cavities 40. The supporting plate 32 has a front region 42 that forms the front edge of the mechanical structure of the seat pan 20. On each of its extreme regions located in the y direction, there is disposed a supporting wing 44. It is hinged about a pivot axis 45 that extends substantially parallel to the z axis. Alternatively, it may be connected to the supporting plate 32. Each supporting wing 44 is elastically biased by a spring (not shown) or another elastic means in such a manner that a free end 46 of the respective supporting wing 44 is biased toward the supporting plate 32 or, put another way, toward the guide 34. It fits against a slide or guide surface 49 on the seat part 30. The left supporting wing 44 forms the left front corner of the seat pan 20, the right supporting wing 44, the right front corner of the seat pan 20. In the position in which the seat has the shortest length, the supporting wings 44 fit against the outer surfaces of the side parts 38, leaving but a small space. In the position in which the supporting plate 32 is pushed farthest forward, there is a large space and the supporting wings 44 project slightly further in the x direction than in the case in which the seat has the shortest length.

Substantially, the supporting wings 44 form the foremost side edges of the seat pan 20. They have a profile height of at least 30, preferably 50 mm in the z direction, and substantially a C profile. They can absorb forces in the z direction as they occur in normal operation.

The free ends 46 fit slidingly against the sides of the seat part 30. Preferably, a slide means 48, for example a plastic layer, is provided at the free ends. The free ends 46 show substantially backward in the longitudinal direction 36. In a known way, the seat pan 20 has a spring system 50 that bridges a recess 102 in the seat part 30.

As shown in FIG. 3, a slide surface 52 is interposed between the supporting plate 32 and the padding 28. It is provided either on the supporting plate 32 or, as shown in FIG. 3, on the padding 28. It is made from a plastic foil for example. It covers the surface of the padding 28 in the region that is in contact with the supporting plate 32 and with its supporting wings 44. Upon adjustment of the supporting plate 32 relative to the seat part 30, the supporting plate 32 moves relative to the padding 28. The slide surface 52 facilitates this relative movement. In the region of the front edge of the seat, the padding 28 is not connected with the mechanical carrier structure. An elastic part 54, for example a rubber band, is sewn in the border of the covering 26. In an alternative, the border is connected to the mechanical carrier structure through springs, rubber strips or the like. As a result, the border is allowed to move relative to the supporting plate 32. Upon adjustment of the seat depth, the edge of the covering 26 is displaced although it always remains beneath the seat pan 20. As a result, other areas of the covering 26 form the foremost upper padding edge, depending on the position of the supporting plate 32. In the region located behind the supporting plate 32, in particular in the region of the spring system 50, the padding 28 is connected, according to prior art, to the seat part 30 and so on, since there is no relative movement in this region. The limit between normal covering and movable covering is approximately in a line parallel to the y axis that passes through the basis of the U-shaped recess 102 of the seat part 30. It is also possible to connect the side parts 38 to the padding 28.

The seat part 30 may also be configured differently from the configuration shown. It is illustrated as a cushion shell, but may also be configured to be a half shell or a simple front crossbeam.

A motor driven adjustment device 60 is associated with the guide 34. The adjustment device has an electric motor 62 with a gear 64 flanged thereon and a pinion 66. It further has a flat, substantially rectangular adjustment module 68 that is located between the supporting plate 32 and the seat part 30. This adjustment module 68 forms the guide 34 on the one side; on the other side, it converts the rotational movement of the pinion 66 into a movement in the longitudinal direction 36. Abutments 70 are provided, which limit the movement of the adjustment module 68 in the two senses of the longitudinal direction 36.

Figure 7:
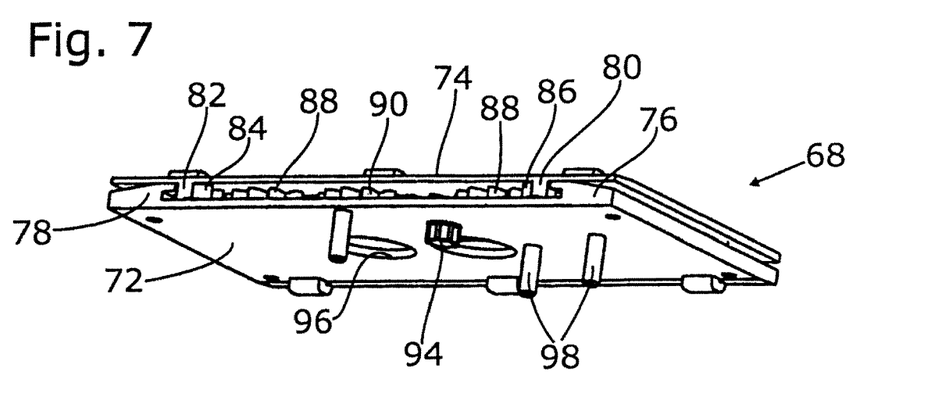
FIG. 7: shows the adjustment module of FIG. 6, but now in the assembled condition.
Figure 8:
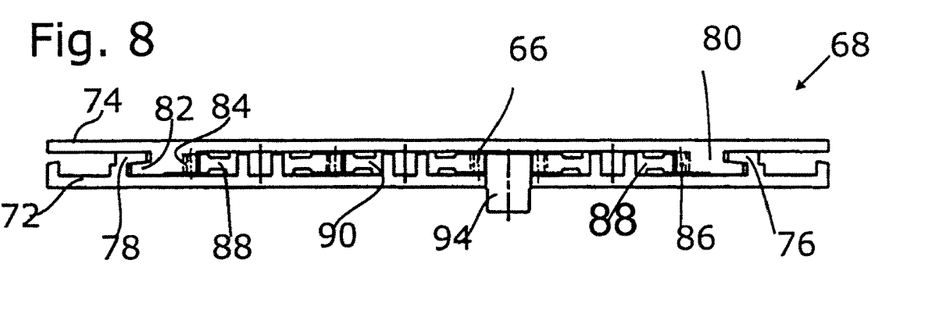
FIG. 8: is a sectional view through a section plane that is defined by the rotation axes of the gear wheels and the idler gear.

The adjustment module 68 has a first gear plate 72, which is part of the seat part 30. It further has a second gear plate 74, which is part of the supporting plate 32. The guide 34 is formed by a left profile 76 and by a right profile 78 of the first gear plate 72 and a left counterprofile 80 as well as a right counterprofile 82 of the second gear plate 74. The two gear plates 72, 74 are substantially rectangular and are quite thin in the z direction, for example 3-8 mm thick. In proximity to their small sides there are provided the profiles 76, 78 and the counterprofiles 80, 82 respectively. As can be seen from the Figures, in particular from the FIGS. 6 through 8, the profiles 76, 78 and the counterprofiles 80, 82 are substantially L-shaped with a free leg of the L alternately engaging a groove formed between the other free leg of the L and the actual plate body from which the profile or the counterprofile protrudes. The left profile 76 and the left counterprofile 80 thus form a pair, and the right profile 78 and the right counterprofile 80 as well. The free legs of the profiles 76, 78 project toward each other. The free legs of the counterprofiles 80, 82 are directed away from each other. Generally, engagement is achieved, as best seen in FIG. 8. The two gear plates 72, 74 are retained by the guide 34 in such a manner that they cannot be moved relative to each other in the plane of the paper of FIG. 8, but can be moved at right angles thereto. FIG. 8 also shows that the profiles 76, 78 and the counterprofiles 80, 82 each project as far as the plate body of the other gear plate, thus dictating the distance between the two gear plates 72, 74.

A toothed rack 84 is disposed directly on the inner surface of the counterprofiles 80, 82 and is integral therewith. Teeth 86, which face each other and form the toothed rack 84, are disposed on the inner surface. The toothed racks 84 extend over the length of the guide 34 that is to be used for the adjustment movement. The toothed racks 84 extend in the same direction as the guide 34, meaning in the longitudinal direction 36. A gear wheel 88 engages a respective one of the toothed racks 34. The two gear wheels 88 on either side are built identically. One of the gear wheels engages the pinion 66 via an idler gear 90 that is also built identically to the gear wheels 88; the other gear wheel 88 engages directly this pinion. The gear wheels 88, the idler gear 90 and the pinion 66 have rotation axes lying on a common plane, see FIG. 8.

In the embodiment shown, the gear 64 has an output shaft with a non-round plug opening 92. A counterpart 94 which is connected to the pinion 66 is plugged into the opening. It is also possible to dispose the pinion 66 on the output shaft of the gear 64.

The electric motor 62 and the gear 64 together are called a gear motor. The two gear plates 72, 74 are spaced a clear distance apart, this distance being only insignificantly larger than the thickness of the gear wheels 88, the idler gear 90 and the pinion 66 measured in the axial direction. The teeth 86 have the same dimensions in the z direction.

It is possible to form the first gear plate 72 directly on, preferably integral with, the seat part 30. It is possible to configure the second gear plate 74 integral with the supporting plate 32. In the gear plates 72, 74 there are provided holes 96. These holes receive collars protruding axially from the gear wheels 88 and the idler gear. It is sufficient that bearing occurs in only one gear plate 72, 74. The pinion 66, which may be separated, is also carried in a hole of its own. Alternatively, axle journals carrying the gear wheels 88 and so on protrude from the inner surface of at least one gear plate.

Substantially cylindrical pins 98 project from the first gear plate 72. The gear 64 has mating recesses 102 for engagement of the pins 98 during assembly. Thus, the gear 64 is positioned so as to mate the adjustment module 68. In the configuration shown, the seat part 30 comprises the first gear plate 72, which is an injection molded plastic part, and a steel sheet part 100. The steel sheet part 100 has recesses 102 for the pins 98. The steel sheet part 100 is interposed between the first gear plate 72 and the gear motor 62, 64. The supporting plate 32 comprises the second gear plate 74 and a steel sheet plate 104. Suited means are provided for connecting the two together.

Figure 6:
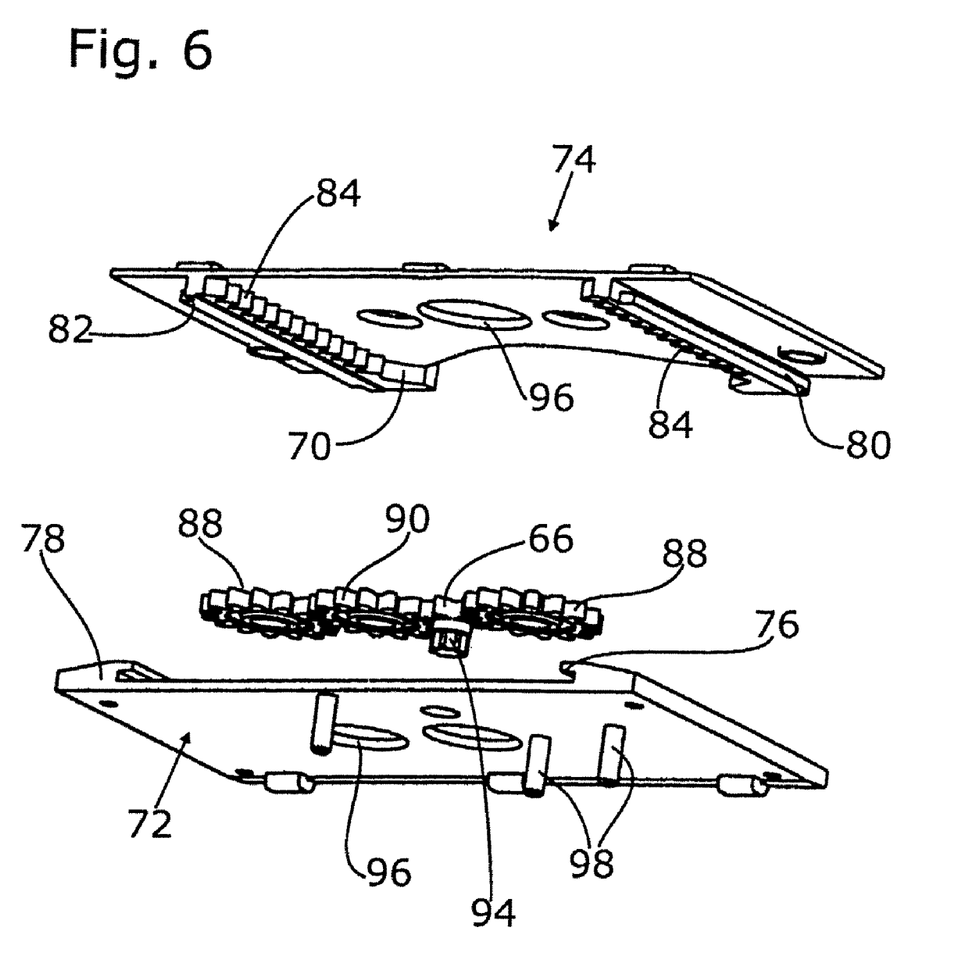
FIG. 6: is an assembly drawing like FIG. 5, but for one adjustment module only.

As shown in FIG. 6 in particular, the toothed racks 84 and the counterprofiles 80 and 82 are configured to be projections integrally formed on the underside of the second gear plate 74 and immediately adjacent. At the rear end, the toothed racks have inclined projections that block the path of the gear wheels 88. At least one of the gear plates 72, 74 has hooks 106 that project from the outer surface and along a long side and that are open toward the other long side. They are hooked into recesses of the associated respective gear plates 72 and 74. The gear plate is only screwed or otherwise fastened on the other long side.

What is claimed is:

1. An adjustment device for a seat depth adjustment of a motor vehicle seat comprising:
    a seat back;
    an underframe;
    a seat pan carried by the underframe; the seat pan comprising a seat part, a supporting plate slidably connected to the seat part via a guide in a longitudinal direction, a rear region of the seat pan formed by the seat part and a front region of the seat pan formed by a front edge of the supporting plate; the seat part and the supporting plate are displaceable with respect to each other in the longitudinal direction, wherein when displacing the seat part and the supporting plate with respect to each other the distance between the rear region of the seat pan and the front region of the seat pan is adjusted between a position of shortest seat length of the seat pan and a position of greatest seat length;
    a covering extending over the seat pan, the covering comprising a border, the border moves relative to a front edge of the supporting plate when the seat pan is adjusted between the position of shortest seat length of the seat pan and the position of greatest seat length; and
    an electric gear motor including a pinion;
    wherein the seat part comprises a first gear plate, the supporting plate comprises a second gear plate, the guide includes a left profile and a right profile on one side of the guide, the profiles being formed on the first gear plate and are integral with the first gear plate and, on another side of the guide, includes a left counterprofile and a right counterprofile that are formed on the second gear plate and are integral with the second gear plate, the left and right counterprofiles contacting and mating with the left and right profiles respectively, a toothed rack defining teeth is associated with each counterprofile and is arranged in a same plane as each counterprofile and extends in a same direction of each counterprofile, and the teeth of the toothed racks face each other, the teeth of each of the toothed racks are integral with the associated counterprofile, each toothed rack is in engagement with a gear wheel and each toothed rack is drivingly connected to the pinion of the gear motor.

2. The adjustment device as set forth in claim 1, wherein at least two gear wheels are provided, the two gear wheels are directly adjacent to the first gear plate and the second gear plate and the two gear wheels have rotation axes lying in one plane.

3. The adjustment device as set forth in claim 1, wherein two gear wheels are provided, the gear wheels have rotation axes, and the rotation axes are parallel.

4. The adjustment device as set forth in claim 1, wherein two gear wheels and an idler gear are provided, the seat part comprises the first gear plate and a steel sheet part, the first gear plate comprises pins that protrude from its underside, the steel sheet part comprises recesses for the pins and a hole for the pinion, and at least one of the two gear wheels, the idler gear and the electric gear motor is located beneath the steel sheet part.

5. The adjustment device as set forth in claim 1, wherein the supporting plate comprises the second gear plate and a steel sheet plate and the second gear plate is located beneath the steel sheet plate and is connected therewith.

6. The adjustment device as set forth in claim 1, wherein each toothed rack is located at its side turned away from the teeth in immediate proximity to its respective counterprofile and the toothed racks and the counterprofiles are each disposed in the same plane.

7. The adjustment device as set forth in claim 1, wherein the toothed racks are spaced a distance apart that is larger than about 40% of the width of the seat pan.

8. The adjustment device as set forth in claim 1, wherein gear wheels are provided and the axial thickness of the gear wheels is slightly less than the clear distance between the first gear plate and the second gear plate and the teeth have the same dimension in a z direction.

9. The adjustment device as set forth in claim 1, wherein gear wheels and an idler gear are provided and the axial thickness of the gear wheels and of the idler gears is about 1 mm less than the clear distance between the first gear plate and the second gear plate.

10. The adjustment device as set forth in claim 1, wherein two gear wheels and an idler gear are provided and each toothed rack engages one of the gear wheels, one of the gear wheels engages the idler gear, and the other gear wheel and the idler gear engage the pinion of the gear motor.

11. The adjustment device as set forth in claim 1, wherein one toothed rack engages the pinion of the gear motor via a gear wheel and the other toothed rack engages the pinion of the gear motor via a gear wheel and an idler gear.

12. An adjustment device for a seat depth adjustment of a motor vehicle seat comprising:
    a seat back;
    an underframe;
    a seat pan comprising a seat part, a supporting plate slidably connected to the seat part via a guide in a longitudinal direction, a seat surface and a front region forming the front edge of the seat pan; the seat part and the supporting plate are displaceable with respect to each other in a longitudinal direction; the seat surface having a variable length, the length varying when the seat part and the supporting plate are displaced with respect to each other in the longitudinal direction;

a padding connected to the seat part and in contact with the supporting plate, the padding moves relative to the supporting plate when the seat pan is adjusted in the guide;

a covering arranged above the padding, the covering comprises a normal covering and a moveable covering, the moveable covering moves when the seat pan is adjusted in the guide; and an electric gear motor including a pinion;

wherein the seat part comprises a first gear plate, the supporting plate comprises a second gear plate, the guide includes a left profile and a right profile on one side of the guide, the profiles being formed integrally on the first gear plate and, on another side of the guide, includes a left counterprofile and a right counterprofile that are formed integrally on the second gear plate, the left and right counterprofiles contacting and mating with the left and right profiles respectively, a toothed rack defining teeth is associated with each counterprofile and extends in a same direction of each counterprofile, and the teeth of the toothed racks face each other, each toothed rack is in engagement with a gear wheel and each toothed rack is drivingly connected to the pinion of the gear motor, the left profile and the right profile each project as far as a plate body of the second gear plate and define the distance between the first gear plate and the second gear plate.

13. The adjustment device as set forth in claim 1, wherein the front region is defined by the supporting plate.

14. The adjustment device as set forth in claim 1, wherein the seat part and the supporting plate are displaceable with respect to each other in an x direction to vary seat pan length.

15. An adjustment device for a seat depth adjustment of a motor vehicle seat comprising:

a seat back;

an underframe;

a seat pan comprising a seat part, a supporting plate slidably connected to the seat part via a guide in a longitudinal direction, and a front region forming the front edge of the seat pan; the seat part and the supporting plate are displaceable with respect to each other in the longitudinal direction; and an electric gear motor including a pinion;

wherein the seat part comprises a first gear plate, the supporting plate comprises a second gear plate, the guide includes a left profile and a right profile on one side of the guide, the profiles being formed on the first gear plate and are integral with the first gear plate and, on another side of the guide, includes a left counterprofile and a right counterprofile that are formed on the second gear plate and are integral with the second gear plate, the left and right counterprofiles contacting and mating with the left and right profiles respectively, a toothed rack defining teeth is associated with each counterprofile and extends in a same direction of each counterprofile, the teeth of each of the toothed racks are integral with the associated counterprofile and the teeth of the toothed racks face each other, each toothed rack is in engagement with a gear wheel and each toothed rack is drivingly connected to the pinion of the gear motor.

16. An adjustment device for a seat depth adjustment of a motor vehicle seat comprising:

a seat back;

an underframe;

a seat pan carried by the underframe; the seat pan comprising a seat part, a supporting plate slidably connected to the seat part via a guide in a longitudinal direction, and a front region of the seat pan formed by a front edge of the supporting plate; the seat part and the supporting plate are displaceable with respect to each other in the longitudinal direction, wherein when displacing the seat part and the supporting plate with respect to each other the seat pan is adjusted between a position of shortest seat length of the seat pan and a position of greatest seat length;

a padding connected to the seat part and in contact with the supporting plate, the padding moves relative to the supporting plate when the seat pan is adjusted between the position of shortest seat length of the seat pan and the position of greatest seat length; and an electric gear motor including a pinion;

wherein the seat part comprises a first gear plate, the supporting plate comprises a second gear plate, the guide includes a left profile and a right profile on one side of the guide, the profiles being formed integrally on the first gear plate and, on another side of the guide, includes a left counterprofile and a right counterprofile that are formed integrally on the second gear plate, the left and right counterprofiles contacting and mating with the left and right profiles respectively, a toothed rack defining teeth is formally integrally with each counterprofile and extends in a same direction of each counterprofile, and the teeth of the toothed racks face each other, each toothed rack is in engagement with a gear wheel and each toothed rack is drivingly connected to the pinion of the gear motor, the left profile and the right profile each project as far as a plate body of the second gear plate and define the distance between the first gear plate and the second gear plate.

17. The adjustment device as set forth in claim 1, wherein the underframe is an underframe of a motor vehicle seat.

* * * * *